United States Patent
Rousseaux et al.

(10) Patent No.: US 10,760,440 B2
(45) Date of Patent: Sep. 1, 2020

(54) ASSEMBLY FOR GAS TURBINE, ASSOCIATED GAS TURBINE

(71) Applicant: SAFRAN AIRCRAFT ENGINES, Paris (FR)

(72) Inventors: Hugo Louis Rousseaux, Moissy Cramayel (FR); Emmanuel Wilfrid Léon Berche, Moissy Cramayel (FR); Alexandre Xavier Bossaert, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 61 days.

(21) Appl. No.: 15/968,162

(22) Filed: May 1, 2018

(65) Prior Publication Data

US 2018/0320539 A1 Nov. 8, 2018

(30) Foreign Application Priority Data

May 2, 2017 (FR) ..................... 17 53844

(51) Int. Cl.
*F01D 11/00* (2006.01)
*F01D 25/24* (2006.01)
(Continued)

(52) U.S. Cl.
CPC .......... *F01D 11/005* (2013.01); *F01D 25/246* (2013.01); *F01D 9/041* (2013.01);
(Continued)

(58) Field of Classification Search
CPC ... F01D 11/005; F05D 2240/55; F16J 15/061; F16J 15/0887; F16J 15/0812; F02C 7/28
See application file for complete search history.

(56) References Cited

U.S. PATENT DOCUMENTS 5,158,430 A * 10/1992 Dixon ................... F01D 11/005
                                                        415/134
5,934,687 A *  8/1999 Bagepalli ............. F01D 11/005
                                                        277/637
(Continued)

FOREIGN PATENT DOCUMENTS

EP     1 291 493 A2    3/2003
EP     1 808 578 A1    7/2007
(Continued)

OTHER PUBLICATIONS

Search Report as issued in French Patent Application No. 1753844, dated Jan. 22, 2018.

*Primary Examiner* — Nicholas L Foster
(74) *Attorney, Agent, or Firm* — Pillsbury Winthrop Shaw Pittman LLP

(57) ABSTRACT

An assembly for gas turbine, includes a first part and a second part installed circumferentially around a longitudinal axis of the turbine, where the first part has a first side face adjacent to a second side face of the second part, and where a first aperture made in first side face is facing a second aperture made in second side face, a sealing plate fitted inside the first aperture and the second aperture, at least one longitudinal face of the sealing plate includes at least two projections made either side of a longitudinal central area of the sealing plate, wherein each projection is of a height chosen so as to reduce a clearance between the sealing plate and the first and second apertures.

10 Claims, 4 Drawing Sheets

(51) Int. Cl.
*F01D 9/04* (2006.01)
*F02C 7/28* (2006.01)
*F16J 15/44* (2006.01)

(52) U.S. Cl.
CPC ............ *F02C 7/28* (2013.01); *F05D 2220/32* (2013.01); *F05D 2240/55* (2013.01); *F05D 2240/57* (2013.01); *F05D 2240/80* (2013.01); *F16J 15/44* (2013.01)

(56) References Cited

U.S. PATENT DOCUMENTS

| | | | | |
|---|---|---|---|---|
| 7,316,402 | B2* | 1/2008 | Paauwe | F01D 11/005 |
| | | | | 277/641 |
| 7,360,769 | B2* | 4/2008 | Bennett | F01D 11/005 |
| | | | | 277/641 |
| 9,500,132 | B2* | 11/2016 | Kugimiya | F01D 11/005 |
| 2003/0039542 | A1* | 2/2003 | Cromer | F01D 11/005 |
| | | | | 415/135 |
| 2007/0158919 | A1* | 7/2007 | Bennett | F01D 11/005 |
| | | | | 277/644 |
| 2007/0210536 | A1* | 9/2007 | Paauwe | F01D 11/005 |
| | | | | 277/644 |
| 2007/0212214 | A1* | 9/2007 | Paauwe | F01D 9/041 |
| | | | | 415/170.1 |
| 2013/0028713 | A1* | 1/2013 | Giri | F16J 15/064 |
| | | | | 415/135 |

FOREIGN PATENT DOCUMENTS

EP  1 878 873 A2  1/2008
FR  2 957 969 A1  9/2011

\* cited by examiner

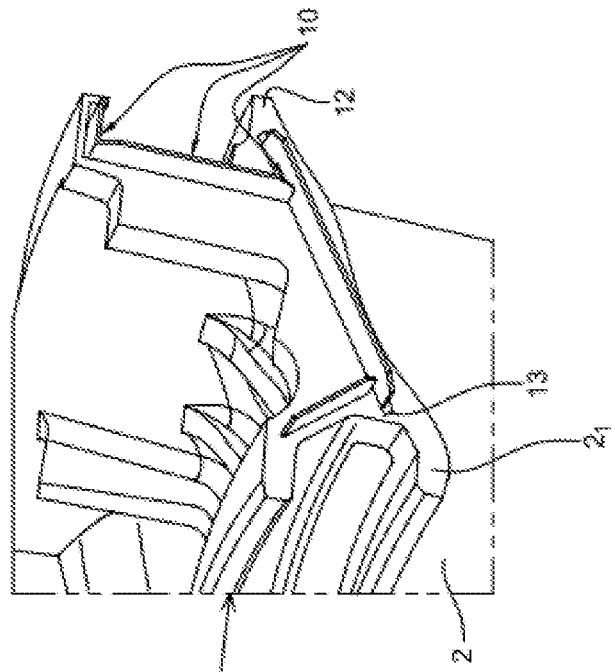
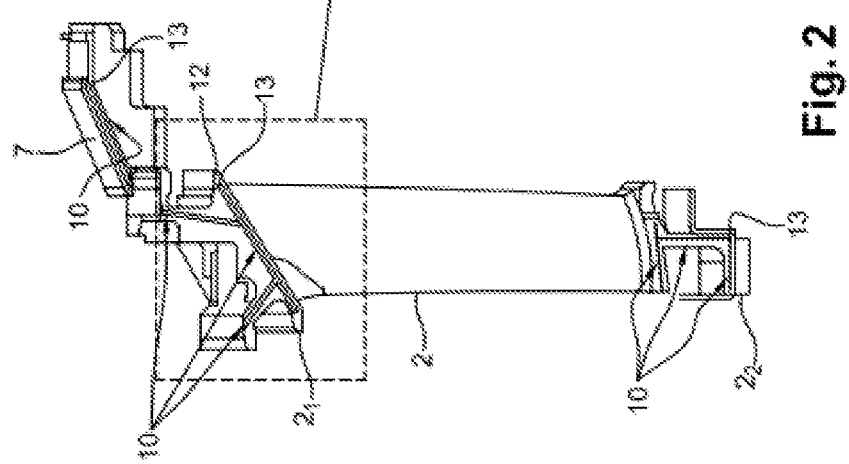

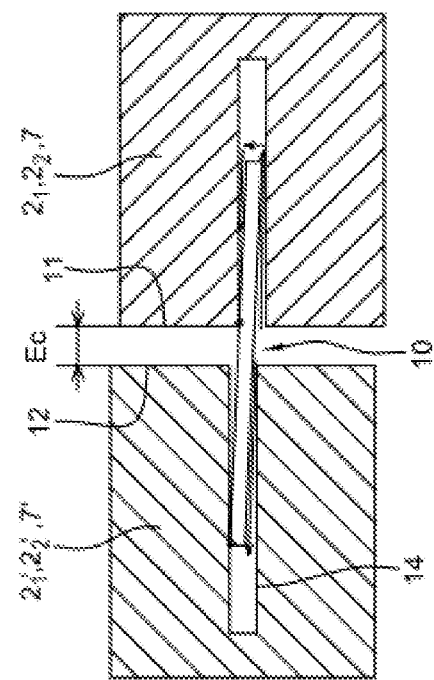
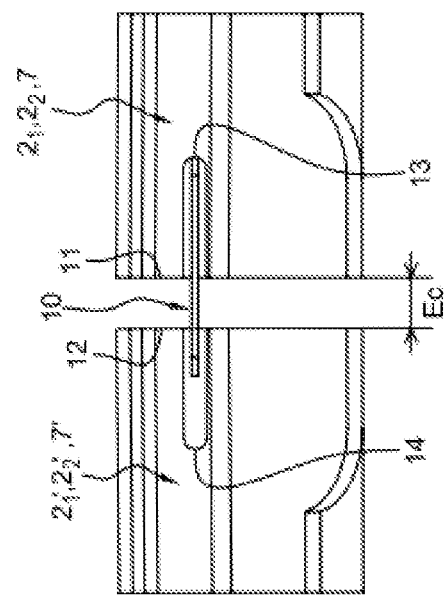

US 10,760,440 B2

ASSEMBLY FOR GAS TURBINE, ASSOCIATED GAS TURBINE

CROSS-REFERENCE TO RELATED APPLICATION

This application claims priority to French Patent Application No. 1753844, filed May 2, 2017, the entire content of which is incorporated herein by reference in its entirety.

TECHNICAL FIELD OF THE INVENTION

The invention relates to the general field of turbomachines, and in particular to an assembly enabling a seal to be maintained in a gas turbine of a turboreactor or turboprop engine.

TECHNOLOGICAL BACKGROUND OF THE INVENTION

Gas turbines recover a proportion of the kinetic energy of the gases being expelled from the combustion chamber to operate the fan, compressor and accessories in a turboreactor, or alternatively to drive the transmission shaft of the propeller, the compressor and various accessories in a turboprop engine.

FIG. 1 represents a longitudinal section of a gas turbine 1.

Gas turbine 1 shown in FIG. 1, with longitudinal axis XX', has four stages: each stage contains a distributor 2A, 2B, 2C and 2D, followed by a rotor 3A, 3B, 3C and 3D.

More specifically, each distributor 2A, 2B, 2C and 2D is formed by an annular row of stator blades 2. At their tips, stator blades 2 of distributor 2A, 2B, 2C and 2D have an external platform $2_1$ and $2_1'$, and at their roots an internal platform $2_2$ and $2_2'$. It should be noted that external platforms $2_1$ and $2_1'$ are joined end-to-end circumferentially around longitudinal axis XX'. In the same way, internal platforms $2_2$ and $2_2'$ are also joined end-to-end circumferentially around longitudinal axis XX'. In addition, each rotor 3A, 3B, 3C and 3D is formed by an annular row of rotor blades.

Distributors 2A, 2B, 2C and 2D are installed between an outside casing 4 and an internal structure 5, while rotors 3A, 3B, 3C and 3D are attached to discs 6A, 6B, 6C and 6D, which are bolted to one another.

Turbine 1 also contains rings 7A, 7B, 7C and 7D, assembled concentrically around rotors 3A, 3B, 3C and 3D of each stage to contain the flow of gases traversing the various stages in airstream 8 of turbine 1. Each ring 7A, 7B, 7C and 7D consists of ring sectors 7, 7', which hold in position distributors 2A, 2B, 2C and 2D and form a sealing means with the tips of the rotor blades of rotors 3A, 3B, 3C and 3D.

To improve the sealing in airstream 8 of turbine 1 it is known to fit sealing plates 10, which can be seen in FIGS. 2 to 4b, between two successive ring sectors 7, 7', between two adjacent external platforms $2_1$ and $2_1'$ and between two adjacent internal platforms $2_2$ and $2_2'$ of two successive stator blades. The addition of sealing plates 10 prevents gas leaks between two adjacent platforms and between two adjacent ring sectors, which may reduce the turbomachine's performance.

When sealing plate 10 is used to seal space Ec between two adjacent external platforms $2_1$, $2_1'$ it is fitted in a first aperture 13 made in a first side face 11 of a first external platform $2_1$ and in a second aperture 14 made in a second side face 12 of a second external platform $2_1'$. It should be noted that first side face 11 of first external platform $2_1$ and second side face 12 of second external platform $2_1'$ are adjacent, and apertures 13 and 14 are facing one another. In addition, when sealing plate 10 is used to seal space Ec between two adjacent internal platforms $2_2$, $2_2'$ sealing plate 10 is fitted in a first aperture 13 made in a first side face 11 of a first internal platform $2_2$ and in a second aperture 14 made in a second side face 12 of a second internal platform $2_2'$. In the same way, to seal space Ec between two adjacent ring sectors 7, 7', sealing plate 10 is fitted in a first aperture 13 made in a first side face 11 of a first ring sector 7 and in a second aperture 14 made in a second side face 12 of a second ring sector 7'. It should be noted that first side face 11 of first ring sector 7 and second side face 12 of second ring sector 7' are adjacent, and apertures 13 and 14 are facing one another However, such sealing plates 10 become worn or become disengaged from apertures 13 and 14. Indeed, the combined vibratory phenomena at high temperatures in airstream 8 when the turbomachine is in operation causes wearing of sealing plates 10, which move and vibrate at the bottoms of apertures 13 and 14 by the force of the gases, leading to premature wear. Depending on the locations of the leaks, an increase of gas leaks through space Ec can cause reduced cooling of the parts of turbine 1, which may cause more or less significant burns, and result in impaired performance.

GENERAL DESCRIPTION OF THE INVENTION

The invention thus provides a solution allowing sealing in the gas turbine, whilst limiting sealing plate wear.

According to a first aspect the invention thus relates to an assembly for a gas turbine, including:

a first part and a second part fitted circumferentially around a longitudinal axis of the gas turbine, where a first side face of the first part is adjacent to a second side face of the second part, a first aperture made in the first side face is facing a second aperture made in the second side face, and where the first aperture and the second aperture each have a radially internal face and a radially external face, where a sealing plate is fitted inside the first aperture and the second aperture.

The sealing plate also includes:

a first longitudinal face installed opposite the radially external face of the first aperture and the radially external face of the second aperture, a second longitudinal face opposite the first longitudinal face, where the second longitudinal face is installed opposite the radially internal face of the first aperture and the radially internal face of the second aperture, at least two projections extending from the second longitudinal face of the sealing plate, either side of a central longitudinal area of the sealing plate, where the height of each projection is chosen so as to reduce a clearance between the sealing plate and the first and second apertures, where the clearance is in range [0.1 mm, 0.5 mm], at least two recesses made in the first longitudinal face and placed close to the two projections, where said at least two recesses are placed opposite the radially external faces of the first and second apertures, where said recesses, said projections and the sealing plate form a monobloc element, and where the recesses and the projections are obtained simultaneously by stamping of the sealing plate.

The term "clearance" is understood to mean the distance between the second longitudinal face of the sealing plate and a radially internal face of the first aperture or of the second aperture facing said second longitudinal face of the sealing plate.

The assembly for gas turbine according to the invention enables the above-mentioned problems to be resolved.

Indeed, fitting the sealing plate between two adjacent parts of the gas turbine enables the space between said parts to be sealed, and thus gas leaks via said space to be prevented. In addition, the presence of the two projections enables the clearance between the sealing plate and the apertures to be reduced. More specifically, the height of the projections is chosen so as to minimise the clearance, in order to restrict the movement of the sealing plate when it is fitted in the apertures. It should be noted that the clearance must be sufficient to enable the sealing plate to be installed in the apertures of the parts. Limiting the sealing plate's movement and vibrations in the apertures means that the sealing plate and the parts of the gas turbine can no longer become worn prematurely, or become disengaged from the apertures, and thus damage other parts of the gas turbine. The maintenance operations and costs relating to the replacement of the parts of the gas turbine are therefore reduced.

Furthermore, the addition of such projections enables the clearance to be reduced, whilst limiting the mass of the sealing plate. Indeed, the use of projections enables the use of very thick sealing plates, which can reduce the turbomachine's performance, to be avoided. It is thus possible to use a thin sealing plate, and to add projections to it the height of which is adjusted depending on the desired clearance between the sealing plate and the apertures. The projections can be made in the sealing plate for example by a process of stamping or forming.

The assembly according to the invention is therefore a simple and inexpensive solution enabling a seal to be made between two adjacent parts of the turbomachine, whilst limiting the mass of said turbine.

In addition to the characteristics which have just been mentioned in the preceding paragraph, the assembly according to the first aspect of the invention may have one or more of the following possible additional characteristics, considered individually or in all technically possible combinations:

According to one non-restrictive embodiment the projections are configured such that they come into contact with the radially internal face of the first aperture and with the radially internal face of the second aperture when the pressure applied to the first longitudinal face exceeds a predetermined threshold.

According to one non-restrictive embodiment the sealing plate is of a given length, and each projection extends over the full length of the sealing plate.

According to one non-restrictive embodiment each recess is placed close to each projection.

According to one non-restrictive embodiment the sealing plate is of constant thickness.

According to one non-restrictive embodiment the two projections are symmetrical about the longitudinal central area of the sealing plate.

According to one non-restrictive embodiment the sealing plate is made of a nickel—or cobalt-based heat-resistant alloy.

According to one non-restrictive embodiment the first part and the second part are stator blade platforms of distributors of the gas turbine.

According to one non-restrictive embodiment the first part and the second part are ring sectors of the gas turbine.

According to one non-restrictive embodiment the first part and the second part are made of a nickel—or cobalt-based heat-resistant alloy.

In addition, according to a second aspect the invention relates to a gas turbine including at least one assembly according to the first aspect.

The invention and its various applications will be better understood on reading the description which follows, and on examining the figures which accompany it.

BRIEF DESCRIPTION OF THE FIGURES

The figures are given for information only, and are not restrictive of the invention in any manner.

The figures show.

DETAILED DESCRIPTION OF AT LEAST ONE AN EMBODIMENT OF THE INVENTION

Unless otherwise stipulated, a given element shown in different figures has a single reference.

Figure 1:
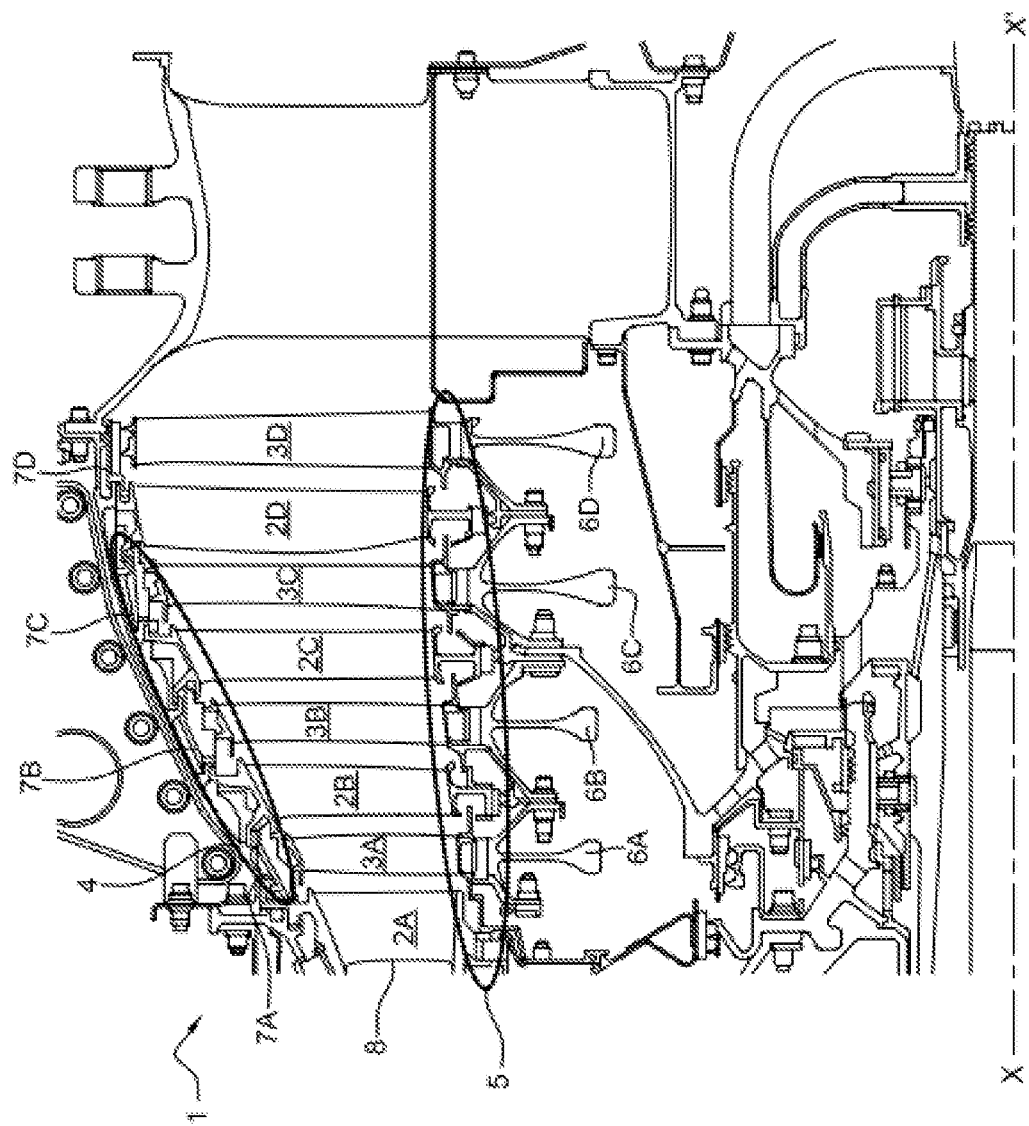
in FIG. 1 a longitudinal section of a gas turbine,
in FIG. 2 a distributor stator blade in which a ring sector of the prior art is installed,
in FIG. 3 an enlargement of the distributor stator blade represented in FIG. 2,
in FIGS. 4a and 4b an assembly for a gas turbine according to the prior art,
in FIG. 5 an assembly for a gas turbine according to one embodiment of the invention,
in FIG. 6 the sealing plate of the assembly shown in FIG. 5.

The invention relates to an assembly 100 enabling a seal to be maintained in a gas turbine 1 of a turboreactor or turboprop engine. In particular, assembly 100 according to the invention limits gas leaks outside airstream 8 of gas turbine 1 which can be seen in FIG. 1.

It should be noted that gas turbine 1, of longitudinal axis XX', contains one or more stages enabling the gases being expelled from the combustion chamber to be expanded, where each stage contains a stator or distributor 2A, 2B, 2C and 2D followed by a rotor 3A, 3B, 3C and 3D. Each distributor 2A, 2B, 2C and 2D contains an annular row of stator blades 2 installed circumferentially around longitudinal axis XX' of turbine 1 between an outside casing 4 and an internal structure 5, and each rotor 3A, 3B, 3C and 3D contains an annular row of rotary blades around said longitudinal axis XX'. The term "external casing" is understood to mean a high-pressure turbine casing or a low-pressure turbine casing. The stator blades of distributor 2A, 2B, 2C and 2D also have an external platform $2_1$ and $2_1'$, and at their roots an internal platform $2_2$ and $2_2'$. The internal and external platforms are joined end-to-end circumferentially around longitudinal axis XX'.

It should also be noted that rings 7A, 7B, 7C and 7D are installed concentrically around rotors 3A, 3B, 3C and 3D of each stage to contain the flow of gases in airstream 8 of gas turbine 1. Each ring 7A, 7B, 7C and 7D consists of ring sectors 7, 7', which hold in position distributors 2A, 2B, 2C and 2D and form a sealing means with the tips of the rotor blades of rotors 3A, 3B, 3C and 3D.

Figure 5:
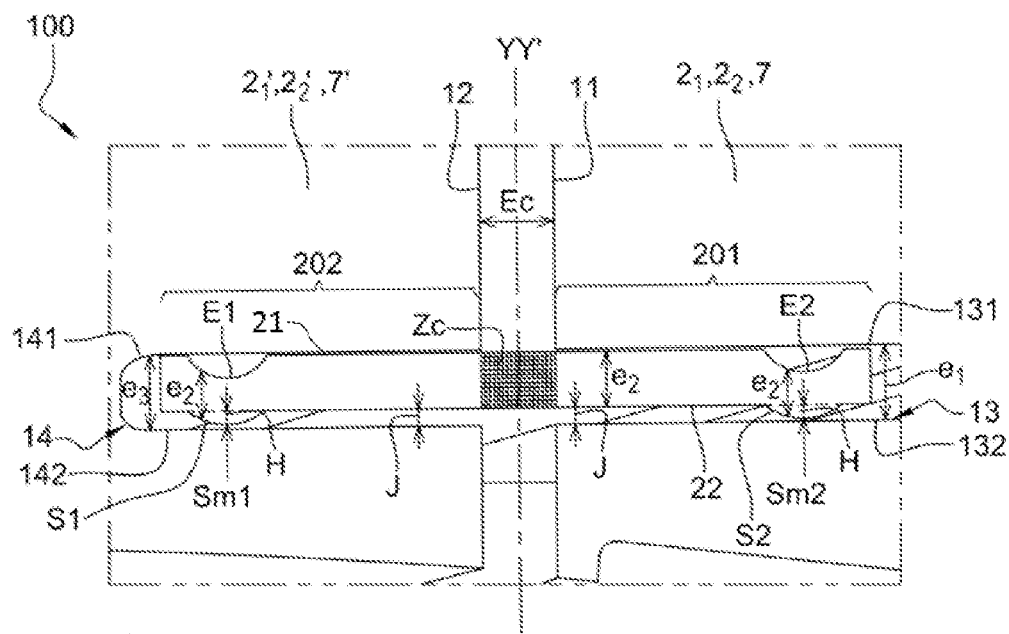

FIG. 5 represents assembly 100 for a gas turbine 1 according to one embodiment of the invention. With reference to FIG. 5, assembly 100 contains:
a first part $2_1$, $2_2$ and 7, a second part $2_1'$, $2_2'$ and $7'$, a sealing plate 20.

According to one embodiment, first part $2_1$ is a first external platform of a first stator blade 2 of distributor 2A, 2B, 2C, 2D and second part $2_1'$ is a second external platform of a second stator blade 2 of distributor 2A, 2B, 2C, 2D adjacent to said first stator blade 2 and separated by a space Ec.

According to another embodiment, first part $2_2$ is a first internal platform of the first stator blade of distributor 2A, 2B, 2C, 2D and second part $2_2'$ is a second internal platform of the second stator blade of distributor 2A, 2B, 2C, 2D adjacent to said first stator blade 2 and separated by a space Ec.

According to another embodiment, first part 7 is a first ring sector 7A, 7B, 7C, 7D and second part 7' is a second ring sector 7A, 7B, 7C, 7D separated by a space Ec. Whether in the case of a distributor stator blade platform or a ring sector, first part $2_1$, $2_2$ and 7 contains a first side face 11 and second part $2_1'$, $2_2'$ and 7' contains a second side face 12 adjacent to the first side face 11 of first part $2_1$, $2_2$ and 7.

A first aperture 13 is also made in first side face 11 of first part $2_1$, $2_2$ and 7. First aperture 13 is, broadly, blind and extends perpendicularly relative to the plane formed by first side face 11. First aperture 13 has a radially external face 131 and a radially internal face 132. The shape and dimensions of first aperture 13 are also designed to receive a first portion 201 of sealing plate 20. First aperture 13 is of thickness $e_1$, which is greater than thickness $e_2$ of sealing plate 20, in order that first portion 201 of sealing plate 20 can be fitted inside first aperture 13. According to one embodiment, first aperture 13 is of thickness $e_1$ in range [0.7 mm, 0.9 mm], and preferentially 0.8 mm.

A second aperture 14 is also made in second side face 12 of second part $2_1'$, $2_2'$ and 7', facing first aperture 13 made in first side face 11 of first part $2_1$, $2_2$ and 7. Second aperture 14 is, broadly, blind and extends perpendicularly relative to the plane formed by second side face 12. Second aperture 14 has a radially external face 141 and a radially internal face 142. The shape and dimensions of second aperture 14 are also designed to receive a second portion 202 of sealing plate 20. Second aperture 14 is of thickness $e_1$, which is greater than thickness $e_2$ of sealing plate 20, in order that second portion 202 of sealing plate 20 can be fitted inside second aperture 14. According to one embodiment, thickness $e_1$ of first aperture 13 is equal to thickness $e_3$ of second aperture 14. According to another embodiment, thickness $e_1$ of first aperture 13 and thickness $e_3$ of second aperture 14 are different. Thus, according to one embodiment, second aperture 14 is of thickness $e_3$ in range [0.7 mm, 0.9 mm], and preferentially 0.8 mm.

The terms such as internal, external, radial, axial, etc., make reference to the position of a part relative to longitudinal axis XX' of gas turbine 1.

Furthermore, according to one embodiment, parts $2_1$, $2_1'$, $2_2$, $2_2'$, 7 and 7' are made of a nickel—or cobalt-based heat-resistant alloy.

Figure 6:
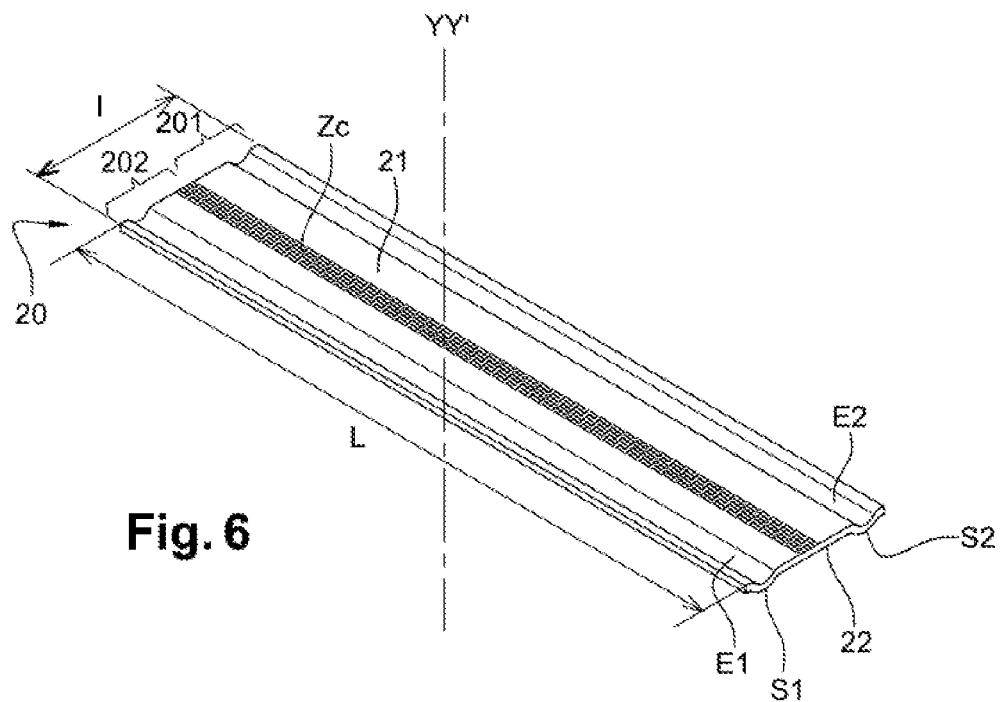

FIG. 6 represents sealing plate 20 of assembly 100 shown in FIG. 5.

Sealing plate 20 is formed by first portion 201 extended by second portion 202. In other words, first portion 201 and second portion 202 form a monobloc element. According to one non-restrictive embodiment, sealing plate 20 broadly has a rectangular, parallelipipedal shape. Sealing plate 20 is of sufficient length L to limit the gas leaks in space Ec between the two parts $2_1$, $2_1'$, $2_2$, $2_2'$, 7 and 7'. Sealing plate 20 is also of sufficient length l to prevent said sealing plate 20 from becoming disengaged from apertures 13 and 14 when turbine 1 is in operation. In other words, the dimensions of sealing plate 20 are chosen such that said sealing plate 20 seals the entire space Ec between first side face 11 and second side face 12, whatever the movements of parts $2_1$, $2_1'$, $2_2$, $2_2'$, 7 and 7' or the thermal expansion to which said parts $2_1$, $2_1'$, $2_2$, $2_2'$, 7 and 7' are subject whilst turbine 1 is in operation.

Sealing plate 20 is also made of a material able to resist the high temperatures of turbine 1 and the stresses exerted by first part $2_1$, $2_2$ and 7 and second part $2_1'$, $2_2'$ and 7' on said sealing plate 20 whilst turbine 1 is in operation. Sealing plate 20 is also advantageously made of a nickel—or cobalt-based heat-resistant alloy.

In addition, as can be seen in FIGS. 5 and 6, sealing plate 20 contains a first longitudinal face 21 and a second longitudinal face 22 facing said first longitudinal face 21. First longitudinal face 21 is installed opposite radially external face 131 of first aperture 13 and radially external face 141 of second aperture 14. Second longitudinal face 22 is installed opposite radially internal face 132 of first aperture 13 and radially internal face 142 of second aperture 14. In particular, projections S1 and S2, which extend from second longitudinal face 22, are designed such that they come into contact with radially internal face 132 of first aperture 13 and of radially internal face 142 of second aperture 14 when the pressure applied to first longitudinal face 21 exceeds a predetermined threshold. The contact of projections S1 and S2 with readily internal faces 132 and 142 of apertures 13 and 14 improves the sealing in airstream 8 of turbine 1 by limiting gas leaks in this area. At least one longitudinal face of sealing plate 20 contains at least two projections S1 and S2 to reduce clearance J between sealing plate 20 and apertures 13 and 14. Clearance J, represented in FIG. 5, is equal to the distance between second longitudinal face 22 of sealing plate 20 and radially internal face 132 of first aperture 13. Clearance J is also equal to the distance between second longitudinal face 22 of sealing plate 20 and radially external face 142 of second aperture 14. Clearance J must be small to limit the movements of sealing plate 20 in apertures 13 and 14, and by this means prevent them from becoming worn. Indeed, if sealing plate 20 moves in apertures 13 and 14 this can cause impacts, leading to damage or breakages, and losses of sealing plate 20. It should be noted that clearance J must be sufficient to enable an operator to be able to fit sealing plate 20 in apertures 13 and 14. In the embodiment shown in FIGS. 5 and 6 it is second longitudinal face 22 which contains the two projections S1 and S2. In another unrepresented embodiment it is first longitudinal face 21 which contains projections S1 and S2. In another unrepresented embodiment first longitudinal face 21 and second longitudinal face 22 contain at least two projections. It should be noted that projections S1 and S2 extend in an axis YY' perpendicular to the longitudinal axis XX' of gas turbine 1.

Projections S1 and S2 are also fitted either side of a central longitudinal area Zc of sealing plate 20. Central longitudinal area Zc is the area of sealing plate 20 which is intended to be fitted in the area of space Ec between first part $2_1$, $2_2$ and 7 and second part $2_1'$, $2_2'$ and 7'. The fitting of projections S1 and S2 either side of central longitudinal area Zc enables the same clearance J to be obtained in apertures 13 and 14. It should be noted that when thicknesses $e_1$ and $e_3$ of apertures 13 and 14 are different, height H of one of the projections is adjusted in order that clearance J is the same in both apertures 13 and 14.

In addition, as can be seen in the embodiment shown in FIG. 6, each projection S1 and S2 extends along entire length L of sealing plate 20, such that clearance J is uniform along the entire length L of sealing plate 20. According to another unrepresented embodiment, sealing plate 20 contains a plurality of projections made in the area of second longitudinal face 22.

The projections are then installed along sealing plate 20, to achieve a uniform clearance J in apertures 13 and 14.

In addition, as can be seen in FIGS. 5 and 6, the two projections S1 and S2 are symmetrical about central longitudinal area ZC of sealing plate 20. In another embodiment, projections S1 and S2 are symmetrical about central longitudinal area ZC of sealing plate 20.

Projections S1 and S2 are of height H chosen such that the distance between first longitudinal face 21 and each tip Sm1 and Sm2 is greater than thickness $e_2$ of sealing plate 20 and roughly less than thicknesses $e_1$ and $e_3$ of first aperture 13 and second aperture 14.

It should be noted that in the embodiment shown in FIG. 5 height H is equal to the distance between each tip Sm1 and Sm2 of projections S1 and S2 and second longitudinal face 22 of sealing plate 20. Height H of projections S1 and S2 is such that clearance J is sufficient to enable an operator to fit sealing plate 20 inside apertures 13 and 14 and to limit the movements of said sealing plate 20 in said apertures 13 and 14. To accomplish this, height H of projections S1 and S2 is chosen according to thicknesses $e_1$ and $e_3$ of apertures 13 and 14. Thus, according to one embodiment, height H of projections S1 and S2 is within range [0.1 mm, 0.2 mm], and preferentially 0.15 mm. Clearance J is also within range [0.1 mm, 0.5 mm].

Furthermore, in order not to reduce the turbomachine's performance, thickness $e_2$ of sealing plate 20 must be kept small to prevent mass being added to turbine 1. Thickness $e_2$ of sealing plate 20 is chosen such that said sealing plate 20 can retain a certain flexibility relative to parts $2_1$, $2_1'$, $2_2$, $2_2'$, 7 and 7'. Such a flexibility of sealing plate 20 means that the installation of parts $2_1$, $2_1'$, $2_2$, $2_2'$, 7 and 7' relative to one another can be simplified. According to one embodiment, sealing plate 20 has a thickness $e_2$ in range [0.4 mm, 0.6 mm], and preferentially 0.5 mm.

In addition, according to one embodiment, in order to limit the mass of sealing plate 20, at least one recess is made in a longitudinal face opposite the longitudinal face containing projections S1 and S2. In the embodiment shown in FIGS. 5 and 6 two recesses E1 and E2 are made in second longitudinal face 21 of said sealing plate 20. Recesses E1, E2 are placed opposite radially external faces 131, 141. The term "opposite" is understood to mean that no element is installed between recesses E1, E2 and radially external faces 131, 141. In other words, recesses E1 and E2 are placed such that they directly face radially external faces 131, 141. More specifically, in this embodiment a recess is placed in the area of each projection to compensate for the mass due to the addition of each projection S1 and S2. Projections S1 and S2 and recesses E1 and E2 can also be manufactured simultaneously, by a stamping or forming process, starting with flat sealing plates used in the prior art. Recesses E1, E2, projections S1, S2 and sealing plate 20 thus form a monobloc element. Thickness $e_2$ of sealing plate 20 is then constant. The use of stamping or forming processes means that the geometry of sealing plates 20 can be modified simply, and height H of projections S1 and S2 can be adjusted to make them appropriate for thicknesses $e_1$ and $e_3$ of apertures 13 and 14.

Assembly 100 according to the invention thus enables gas leaks through space Ec between two adjacent parts of gas turbine 1 to be limited, and the vibrations of sealing plate 20 in apertures 13 and 14 to be limited, whilst limiting the mass of said sealing plate 20. It is no longer then possible for sealing plate 20 to become disengaged from apertures 13 and 14, and thus damage other parts of gas turbine 1. It is also no longer possible for such sealing plates 20 to become worn prematurely, enabling the operations to replace sealing plates 2 to be reduced, and thus also the costs relating to maintenance of gas turbine 1.

The invention claimed is:

1. An assembly for gas turbine, comprising:
    a first part and a second part installed circumferentially around a longitudinal axis of turbine, where the first part has a first side face adjacent to a second side face of the second part, where a first aperture made in the first side face faces a second aperture made in the second side face, and where the first aperture and the second aperture each have a radially internal face and a radially external face;
    a monobloc seal consisting of a sealing plate fitted inside the first aperture and the second aperture;
    wherein the sealing plate includes:
    a first longitudinal face installed opposite the radially external face of the first aperture and the radially external face of the second aperture,
    a second longitudinal face opposite the first longitudinal face, where the second longitudinal face is installed opposite the radially internal face of the first aperture and the radially internal face of the second aperture,
    at least two projections extending from the second longitudinal face of the sealing plate, either side of a central longitudinal area of the sealing plate, where each projection has a height and projects beyond the second longitudinal face to provide a clearance between the second longitudinal face and the radially internal surface, where the clearance is within the range from 0.1 mm to 0.5 mm,
    at least two recesses made in the first longitudinal face and placed close to the two projections, where said at least two recesses are placed opposite the radially external faces of the first and second apertures,
    wherein the recesses and the projections are obtained simultaneously by stamping of the sealing plate, and wherein the sealing plate is substantially flat except where the recesses and projections are located.

2. The assembly for gas turbine according to claim 1, wherein the projections which extend from the second longitudinal face are configured such that they come into contact with the radially internal face of the first aperture and with the radially internal face of the second aperture when the pressure applied to the first longitudinal face exceeds a predetermined threshold.

3. The assembly for gas turbine according to claim 1, wherein each projection extends along an entire length of the sealing plate.

4. The assembly for gas turbine according to claim 1, wherein the sealing plate is of constant thickness.

5. The assembly for gas turbine according to claim 1, wherein the two projections are symmetrical about the longitudinal central area of the sealing plate.

6. The assembly for gas turbine according to claim 1, wherein the sealing plate is made of a nickel—or cobalt-based heat-resistant alloy.

7. The assembly for gas turbine according to claim 1, wherein the first part and the second part are stator blade platforms of distributors of the gas turbine.

8. The assembly for gas turbine according to claim 1, wherein the first part and the second part are ring sectors of the gas turbine.

9. A gas turbine comprising at least one assembly according to claim 1.

10. The assembly for gas turbine according to claim 1, wherein a thickness of the sealing plate between the first and second longitudinal faces is the same at the two recesses and the two projections and outside the two recesses and the two projections.

\* \* \* \* \*